(12) United States Patent
Estes et al.

(10) Patent No.: US 6,803,836 B2
(45) Date of Patent: Oct. 12, 2004

(54) MULTILAYER CERAMIC PACKAGE TRANSMISSION LINE PROBE

(75) Inventors: John C. Estes, Tempe, AZ (US);
Rudolfo Lucero, Scottsdale, AZ (US);
Anthony M. Pavio, Paradise Valley, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 10/256,304

(22) Filed: Sep. 27, 2002

(65) Prior Publication Data

US 2004/0061576 A1 Apr. 1, 2004

(51) Int. Cl.⁷ .............................. H01P 5/02; H01P 3/08
(52) U.S. Cl. ........................................ 333/34; 333/246
(58) Field of Search ........................... 333/33, 34, 204, 333/219, 246

(56) References Cited

U.S. PATENT DOCUMENTS

| | | | | |
|---|---|---|---|---|
| 4,371,853 A | * | 2/1983 | Makimoto et al. | 333/204 |
| 5,066,933 A | * | 11/1991 | Komeda | 333/204 |
| 5,525,953 A | * | 6/1996 | Okada et al. | 333/246 X |

* cited by examiner

Primary Examiner—Benny Lee
(74) Attorney, Agent, or Firm—Michael P. Noonan

(57) ABSTRACT

A multilayer ceramic structure (30) includes a first ceramic layer (32), a second ceramic layer (34) adjacent to the first ceramic layer, and a transmission line (38) formed between the first and second ceramic layers. The transmission line includes first and second portions (44, 46) having a first width, third and fourth portions (47, 48) formed between the first and second portions and having a second width that is narrower than the first width, and a fifth portion (49) formed between the third and fourth portions. A probe (40), comprising a conductively filled via, is attached at one end to the fifth portion, the probe passing through the second ceramic layer for providing a test point (42). The structure compensates for return loss induced by the probe.

18 Claims, 2 Drawing Sheets

MULTILAYER CERAMIC PACKAGE TRANSMISSION LINE PROBE

FIELD OF THE INVENTION

The present invention relates in general to multilayer ceramic packages and, more particularly, to a probe for testing signals on transmission lines in multilayer ceramic packages.

BACKGROUND OF THE INVENTION

The use of transmission lines to propagate electrical signals through multilayer ceramic packages is well known in the art. For example, it is common to build multiple layers of such devices by screen printing a conductive paste (e.g., silver, gold, copper, nickel, palladium, platinum or the like) on layers of a ceramic green tape according to a predetermined pattern. The layers are co-fired to form a dense ceramic package. Vias are typically formed for bridging electrical signals between conductive layers.

A typical transmission line comprises inherent distributed inductances 12 and 14 and shunt capacitances 16, 18, and 20 as illustrated in FIG. 1 which must be taken into consideration when designing the multilayer ceramic package.

In many applications, such as for radio frequency devices, the transmission lines couple components such as filters and baluns within the ceramic package. During the manufacture of these ceramic packages, or even after the package is manufactures, it is desirable to check the signal being propagated on various transmission lines coupling these components. However, the act of integrating a probe feed into the package (applying a conductor to the transmission line) changes the capacitance of the transmission line and adversely affects the signal being transmitted. FIG. 2 illustrates yet another transmission line comprising inherent distributed inductances 12 and 14, shunt capacitances 16, 18, and 20, and an additional capacitance 24 at node 22 from a probe. This additional capacitance 24 is undesirable as it introduces a discontinuity onto the transmission line resulting in a degradation of the transmitted signal.

DETAILED DESCRIPTION OF THE PREFERRED EMBODIMENT

Figure 1:
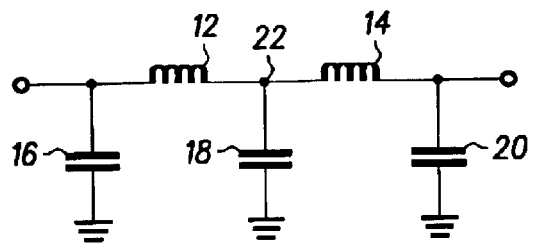
FIG. 1 illustrates a schematic of the inductance and shunt capacitance of a known ceramic package transmission line.
Figure 2:
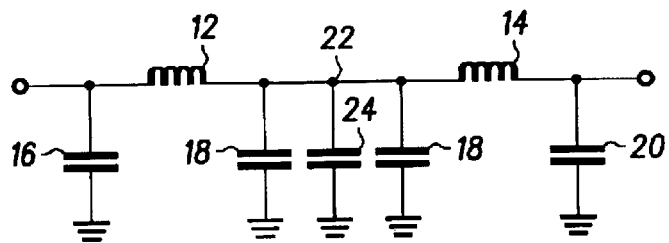
FIG. 2 illustrates a schematic of the inductance and shunt capacitance of a known ceramic package transmission line having an integrated probe feed.
Figure 3:
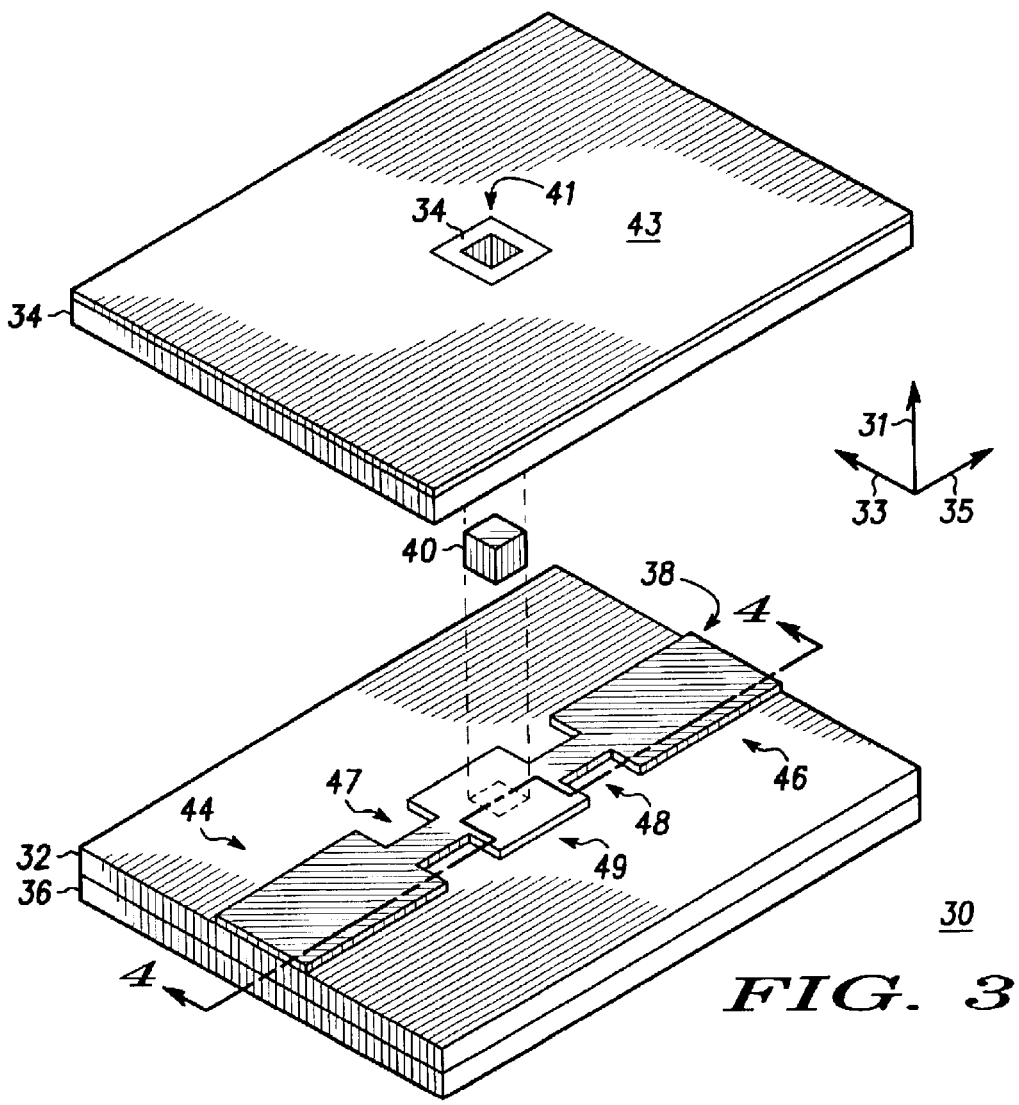
FIG. 3 illustrates a plan view of a ceramic package in accordance with an embodiment of the present invention.
Figure 4:
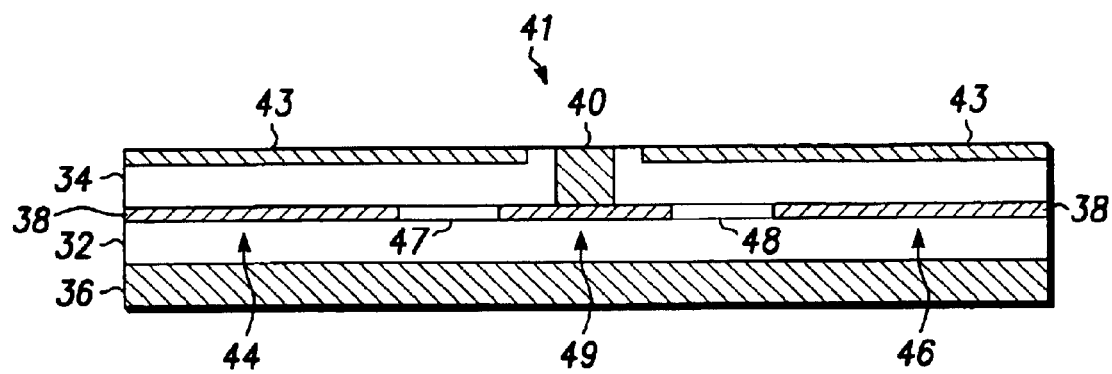
FIG. 4 illustrates a cross section view of the ceramic package of FIG. 3.

Referring to FIGS. 3 and 4, a multilayer ceramic package 30 comprises contiguous ceramic layers 32 and 34. A ground plane 36 and a transmission line 38 are formed on the ceramic layer 32. Although only two ceramic layers 32 and 34 and one transmission line 38 are shown, a typical ceramic package includes many more layers and transmission lines. The ceramic package 30 may, for example, be 20 to 80 mils thick (direction 31), with each ceramic layer, for example, being about 4 mils thick (direction 31). Such transmission lines are typically connected through the package by a set of conductively filled vias (not shown) through the ceramic layers 32 and 34 which interconnect the printed patterns on each layer of the package. These transmission lines are typically formed by screen printing a conductive paste (e.g., silver, gold, copper, nickel, palladium, platinum or the like) onto the ceramic layer. The conductive material within the vias typically comprise a material of silver, gold, copper, nickel, palladium, platinum or the like.

An exemplary embodiment of the present invention comprises a probe 40 (a conductively filled via 41) connected at one end to the transmission line 38 on the ceramic layer 32, and extending at the other end through the ceramic layer 34. The probe 40 generally is 4–20 mils, and preferably about 10 mils, along its sides (directions 33 and 35). The transmission line 38, in accordance with the embodiment described, comprises first and second portions 44 and 46 having a first width, third and fourth portions 47 and 48 having a second width that is narrower than the first width, and a fifth portion 49 . This narrow width of the transmission line 38 at third and fourth portions 47 and 48 increases the distributed inductance (see FIG. 5) of the transmission line 38 at the probe 40 while at the same time decreasing the distributed capacitance of the transmission line 38 at the probe 40. The decreased capacitance of the transmission line 38 at the probe 40 reduces the effect of some of the probe's 40 capacitance 24, while the increased inductance of the transmission line 38 resonates out the remaining capacitance 24 introduced by the probe 40. In effect, the narrowing of the transmission line 38 at the probe 40, cancels out the discontinuity introduced by the probe 40. The thickness (direction 31) of the transmission line 38 (including portions 44, 46, 47, 48, and 49) is, for example, 0.3–1.0 mils. The width (dimension 33) of the first and second portions 44 and 46 is in the range of 4–20 mils, and preferably 8–10 mils. The third and fourth portions 47 and 48 generally have a width (direction 33) of 2–18 mils, and preferably a width of 4–8 mils.

The fifth portion 49 may have a width (direction 33) that generally is as large as the similar dimension of either first and second portions 44 and 46, but may have a width similar to the third portion 48 or larger. The fifth portion 49 more typically has a width (direction 33) larger than that of the probe 40.

The probe 40 extends through ceramic layer 34 through a via 41. A ground plane 43 optionally surrounds the probe 40 without making contact.

Figure 5:
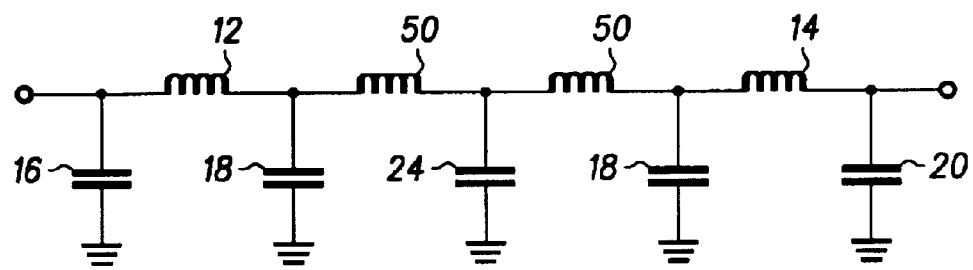
FIG. 5 illustrates a schematic of the inductance and shunt capacitance of the ceramic package transmission line in accordance with an embodiment of the present invention.

FIG. 5 illustrates a schematic of the inductance and shunt capacitance of ceramic package transmission line 38 shown in FIG. 4. More particularly, FIG. 5 illustrates a transmission line which comprises distributed inductances 12, 14 and 50 and shunt capacitances 16, 18, 20 and 24. As best illustrated in FIG. 4, conductive material 40 which forms the probe, is formed within via 41 from the fifth portion 49 through the second dielectric layer 34. Conductive material 40 provides for a third inherent capacitance 24 and inductance 50 (FIG. 5) that cause a return loss that counterbalances the second return loss. In addition, it should be understood that anticipated by this disclosure is a transmission line, generally similar to that illustrated in FIG. 5, in which included is a first inherent capacitance and inductance that causes a first return loss, a second inherent capacitance and inductance that causes a second return loss, a third inherent capacitance and inductance that causes a third return loss, and a conductive material having an inherent capacitance and inductance that causes a return loss that is reduced in effect by the second and third return losses.

Figure 6:
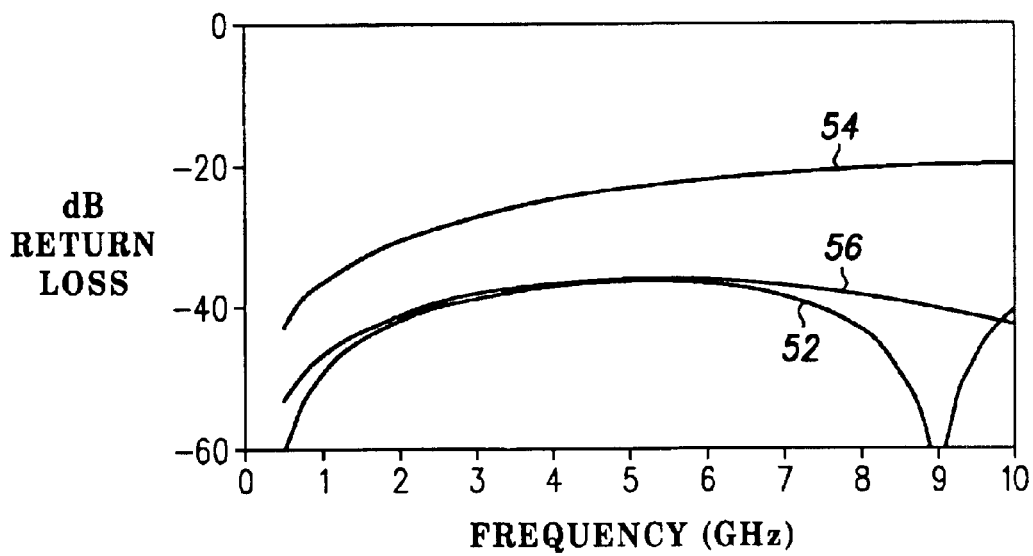
FIG. 6 is a chart illustrating the return loss of an embodiment of the present invention compared with that of a typical transmission line being probed.

FIG. 6 illustrates the return loss in dB of the transmission line 38. Curve 52 is illustrative of a transmission line that is not being probed. Curve 54 is illustrative of a transmission line, with an attached integrated probe feed, that is all of the same width. The degradation of return for curve 54 could be, for example, as high as 20 dB in part of the frequency range. Curve 56 is illustrative of a transmission line 38 that has been narrowed in accordance with an embodiment of the present invention. It may be seen that the transmission line 38 yields a return loss similar to the known transmission line not being probed.

The above embodiment of the invention is illustrative only, and that modifications thereof may occur to those skilled in the art. Accordingly, this invention is not to be regarded as limited to the embodiment disclosed herein, but is to be limited as defined by the appended claims.

What is claimed is:

1. A multilayer structure, comprising:
   a first dielectric layer;
   a second dielectric layer contiguous to the first dielectric layer;
   a transmission line disposed between the first and second dielectric layers, the transmission line comprising first and second portions having a first width, a third and a fourth portion disposed between the first and second portions and having a second width that is narrower than the first width, and a fifth portion disposed between the third and fourth portions; and
   a conductive material disposed within a via from the fifth portion through the second dielectric layer.

2. The multilayer ceramic structure of claim 1 wherein the width of the first and second portions is in the range of 4 to 20 mils and the width of the third and fourth portions is in the range of 2 to 18 mils.

3. The multilayer ceramic structure of claim 1 wherein the width of the first and second portions is in the range of 8 to 10 mils and the width of the third and fourth portions is in the range of 4 to 8 mils.

4. The multilayer ceramic structure of claim 3 wherein the conductive material comprises a width in the range of 4 to 20 mils.

5. The multilayer ceramic structure of claim 1 wherein the transmission line comprises a conductive paste.

6. The multilayer ceramic structure of claim 5 wherein the conductive paste comprises one of silver, gold, copper, nickel, palladium, and platinum.

7. A multilayer ceramic structure, comprising:
   a first ceramic layer;
   a second ceramic layer adjacent to the first ceramic layer;
   a transmission line disposed between the first and second ceramic layers, the transmission line comprising first and second portions having a first width, third and fourth portions disposed between the first and second portions and having a second width that is narrower than the first width, and a fifth portion disposed between the third and fourth portions; and
   a probe, comprising a conductively filled via, attached at one end to the fifth portion, the probe passing through the second ceramic layer.

8. The multilayer ceramic structure of claim 7 wherein the width of the first and second portions is in the range of 4 to 20 mils and the width of the third and fourth portions is in the range of 2 to 18 mils.

9. The multilayer ceramic structure of claim 7 wherein the width of the first and second portions is in the range of 8 to 10 mils and the width of the third and fourth portions is in the range of 4 to 8 mils.

10. The multilayer ceramic structure of claim 9 wherein the probe comprises a width in the range of 4 to 20 mils.

11. The multilayer ceramic structure of claim 7 wherein the transmission line comprises a conductive paste.

12. The multilayer ceramic structure of claim 11 wherein the conductive paste comprises one of silver, gold, copper, nickel, palladium, and platinum.

13. A multilayer structure, comprising:
   a first dielectric layer;
   a second dielectric layer adjacent to the first dielectric layer;
   a transmission line disposed between the first and second dielectric layers, the transmission line comprising first and second portions having a first width, third and fourth portions disposed between the first and second portions, having a second width that is narrower than the first width and inherent capacitance and inductance that cause a first return loss, a fifth portion disposed between the third and fourth portions; and
   a conductive material disposed within a via from the fifth portion through the second dielectric layer, the conductive material having an inherent capacitance and inductance that cause a second return loss that counterbalances the first return loss.

14. The multilayer ceramic structure of claim 13 wherein the width of the first and second portions is in the range of 4 to 20 mils and the width of the third and fourth portions is in the range of 2 to 18 mils.

15. The multilayer ceramic structure of claim 13 wherein the width of the first and second portions is in the range of 8 to 10 mils and the width of the third and fourth portions is in the range of 4 to 8 mils.

16. The multilayer ceramic structure of claim 15 wherein the conductive material comprises a width in the range of 4 to 20 mils.

17. The multilayer ceramic structure of claim 13 wherein the transmission line comprises a conductive paste.

18. The multilayer ceramic structure of claim 17 wherein the conductive paste comprises one of silver, gold, copper, nickel, palladium, and platinum.

* * * * *